United States Patent
Yamafuku et al.

(10) Patent No.: US 10,340,482 B2
(45) Date of Patent: Jul. 2, 2019

(54) ENERGY STORAGE APPARATUS

(71) Applicant: GS Yuasa International Ltd., Kyoto-shi (JP)

(72) Inventors: Taro Yamafuku, Kyoto (JP); Takeshi Sasaki, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 528 days.

(21) Appl. No.: 14/849,173

(22) Filed: Sep. 9, 2015

(65) Prior Publication Data
US 2016/0072104 A1 Mar. 10, 2016

(30) Foreign Application Priority Data
Sep. 10, 2014 (JP) ................. 2014-184176

(51) Int. Cl.
*H01M 2/02* (2006.01)
*H01M 2/10* (2006.01)
*H01M 10/6557* (2014.01)
*H01M 10/658* (2014.01)

(52) U.S. Cl.
CPC ......... *H01M 2/0217* (2013.01); *H01M 2/024* (2013.01); *H01M 2/0292* (2013.01); *H01M 2/1016* (2013.01); *H01M 10/6557* (2015.04); *H01M 10/658* (2015.04)

(58) Field of Classification Search
CPC .. H01M 2/0217; H01M 2/024; H01M 2/1016; H01M 2/0292; H01M 10/658
See application file for complete search history.

(56) References Cited

U.S. PATENT DOCUMENTS

| | | |
|---|---|---|
| 2009/0111010 A1 | 4/2009 | Okada et al. |
| 2011/0195301 A1 | 8/2011 | Taniguchi et al. |
| 2012/0003526 A1 | 1/2012 | Kume et al. |
| 2012/0171554 A1 | 7/2012 | Kim |
| 2013/0034764 A1 | 2/2013 | Ochi et al. |
| 2014/0193702 A1 | 7/2014 | Woehrle et al. |

FOREIGN PATENT DOCUMENTS

| | | | |
|---|---|---|---|
| JP | 2011-181485 A | 9/2011 | |
| JP | 2012-014962 A | 1/2012 | |
| JP | 2012-033419 A | 2/2012 | |
| JP | 2012233419 * | 2/2012 | ............. H01M 2/10 |
| JP | 2012-119157 * | 6/2012 | ............. H01M 2/10 |
| JP | 2012-119157 A | 6/2012 | |

(Continued)

*Primary Examiner* — Jonathan Crepeau
*Assistant Examiner* — Angela J Martin
(74) *Attorney, Agent, or Firm* — McGinn IP Law Group, PLLC (57) ABSTRACT

An energy storage apparatus includes: at least one energy storage device which includes an electrode assembly and a case for housing the electrode assembly; a spacer which is arranged adjacent to the case; and a holder which holds the energy storage device and the spacer. The energy storage device includes an insulating film which covers an outer surface of the case and is adhered to at least a portion of the outer surface of the case. The spacer has at least one of edges and corners thereof disposed at positions where the edges or the corners are in contact with the outer surface of the case with the insulating film interposed therebetween.

19 Claims, 6 Drawing Sheets

(56) References Cited

FOREIGN PATENT DOCUMENTS

| | | |
|---|---|---|
| JP | 2012-142288 A | 7/2012 |
| JP | 5121395 B2 | 1/2013 |
| JP | 2013-033668 A | 2/2013 |
| JP | 2013-541152 A | 11/2013 |
| JP | 2015-022915 A | 2/2015 |

\* cited by examiner

ENERGY STORAGE APPARATUS

CROSS-REFERENCE TO RELATED APPLICATIONS

This application claims the benefit of Japanese patent application No. 2014-184176, filed on Sep. 10, 2014, which is incorporated by reference.

FIELD

The present invention relates to an energy storage apparatus which includes: energy storage devices each of which has an insulating film for covering a case; and spacers arranged adjacent to the energy storage devices.

BACKGROUND

Conventionally, there has been known a power supply which includes: a plurality of prismatic battery cells; a plurality of separators each of which is sandwiched between two prismatic battery cells arranged adjacent to each other; and a fastening units which holds the prismatic battery cells and the separators. The prismatic battery cell includes: an electrode assembly; an exterior container which houses the electrode assembly; and an insulating film which covers the exterior container (JP-A-2013-033668, for example).

In the power supply, when vibrations are applied to the whole power supply or when respective parts of the power supply are deformed, the prismatic battery cell and the separator which are arranged adjacent to each other move relative to each other so that the prismatic battery cell and the separator rub each other. In this case, when the separator has edges or corners thereof at positions where the separator is brought into contact with an outer surface of an exterior container with an insulating film interposed between the separator and the prismatic battery cell, there may be a case where the edges or the corners rub the insulating film so that a small crack occurs in the insulating film.

In general, the insulating film is made of a resin so that a crack is liable to expand. Accordingly, when a small crack occurs in the insulating film due to rubbing or the like, the crack expands so that dew condensation water or the like is liable to enter the crack whereby insulation property of the exterior container with respect to the outside is deteriorated.

SUMMARY

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

An object of the present invention to provide an energy storage apparatus where insulation property of a case of an energy storage device is minimally deteriorated.

An aspect of the present invention is directed to an energy storage apparatus which includes: at least one energy storage device which includes an electrode assembly and a case for housing the electrode assembly; a spacer which is arranged adjacent to the case; and a holder which holds the energy storage device and the spacer, wherein the energy storage device includes an insulating film which covers an outer surface of the case and is adhered to at least a portion of the outer surface of the case, the spacer has at least one of an edge and a corner thereof disposed at a position where the edge or the corner is in contact with the outer surface of the case with the insulating film interposed therebetween, and the insulating film is adhered to the outer surface of the case in an adhesion zone of an opposedly-facing region where the energy storage device opposedly faces the spacer, the adhesion zone overlapping with at least one of the edge and the corner of the spacer in a direction along which the energy storage device and the spacer are arranged.

BRIEF DESCRIPTION OF DRAWINGS

The foregoing and other features of the present invention will become apparent from the following description and drawings of an illustrative embodiment of the invention in which.

DESCRIPTION OF EMBODIMENTS

An aspect of the present invention is directed to an energy storage apparatus which includes: at least one energy storage device which includes an electrode assembly and a case for housing the electrode assembly; a spacer which is arranged adjacent to the case; and a holder which holds the energy storage device and the spacer, wherein the energy storage device includes an insulating film which covers an outer surface of the case and is adhered to at least a portion of the outer surface of the case, the spacer has at least one of an edge and a corner thereof disposed at positions where the edge or the corner are in contact with the outer surface of the case with the insulating film interposed therebetween, and the insulating film is adhered to the outer surface of the case in an adhesion zone of an opposedly-facing region where the energy storage device opposedly faces the spacer, the adhesion zone overlapping with at least one of the edges and the corners of the spacer in a direction along which the energy storage device and the spacer are arranged.

In such a configuration, the insulating film is adhered to the outer surface of the case in a region (adhesion zone) including a position where the outer surface of the case overlaps with at least one of the edges and the corners of the spacer (hereinafter also simply referred to as "edges or the like"). That is, portions of the insulating film with which the edges or the like of the spacer are brought into contact and an area of the insulating film around such a portion are adhered to the outer surface of the case. Accordingly, even when a small crack or the like occurs in the portion of the insulating film which corresponds to the adhesion zone due to rubbing or the like of the insulating film with the edges or the like of the spacer, the expansion of the crack or the like can be suppressed by the adhesion of the insulating film with the outer surface of the case and hence, the deterioration of insulation property of the case can be suppressed.

In the energy storage apparatus, the energy storage apparatus may include a plurality of energy storage devices arranged in a row, the spacer may include an inner spacer arranged between the energy storage devices arranged adjacent to each other, and the oppositely-facing region of each of the plurality of energy storage devices may be a region formed on the outer surface of the case, which oppositely faces the inner spacer.

With such a configuration, even when a small crack or the like occurs in the insulating films which cover the respective cases of the energy storage devices arranged adjacent to each other with the inner spacer interposed therebetween due to rubbing or the like of the insulating film with the edges or the like of the inner spacer, the expansion of the crack or the like can be suppressed and hence, it is possible to prevent short-circuit between the cases of the energy storage devices arranged adjacent to each other with the inner spacer interposed therebetween.

The case may include a bottomed cylindrical case body having a prismatic cylindrical barrel portion, and the insulating film may cover a whole barrel portion.

With such a configuration, in the case of the so-called prismatic energy storage device, the barrel portion having a large surface area is insulated as a whole and hence, the short-circuit between the cases can be effectively prevented.

In the energy storage device of the energy storage apparatus, the whole insulating film may be adhered to the case.

With such a configuration, even when small crack or the like occurs in the insulating film at a portion other than a portion of the insulating film which rubs the edges or the like of the spacer, the expansion of the crack or the like can be suppressed.

As has been described above, it is possible to provide an energy storage apparatus where insulation property of the case of the energy storage device is minimally deteriorated.

Hereinafter, an energy storage apparatus according to one embodiment of the present invention is described by reference to drawings. Names of respective members (respective elements) in this embodiment are used only for this embodiment, and may differ from names of respective members (respective elements) used in BACKGROUND.

Figure 1:
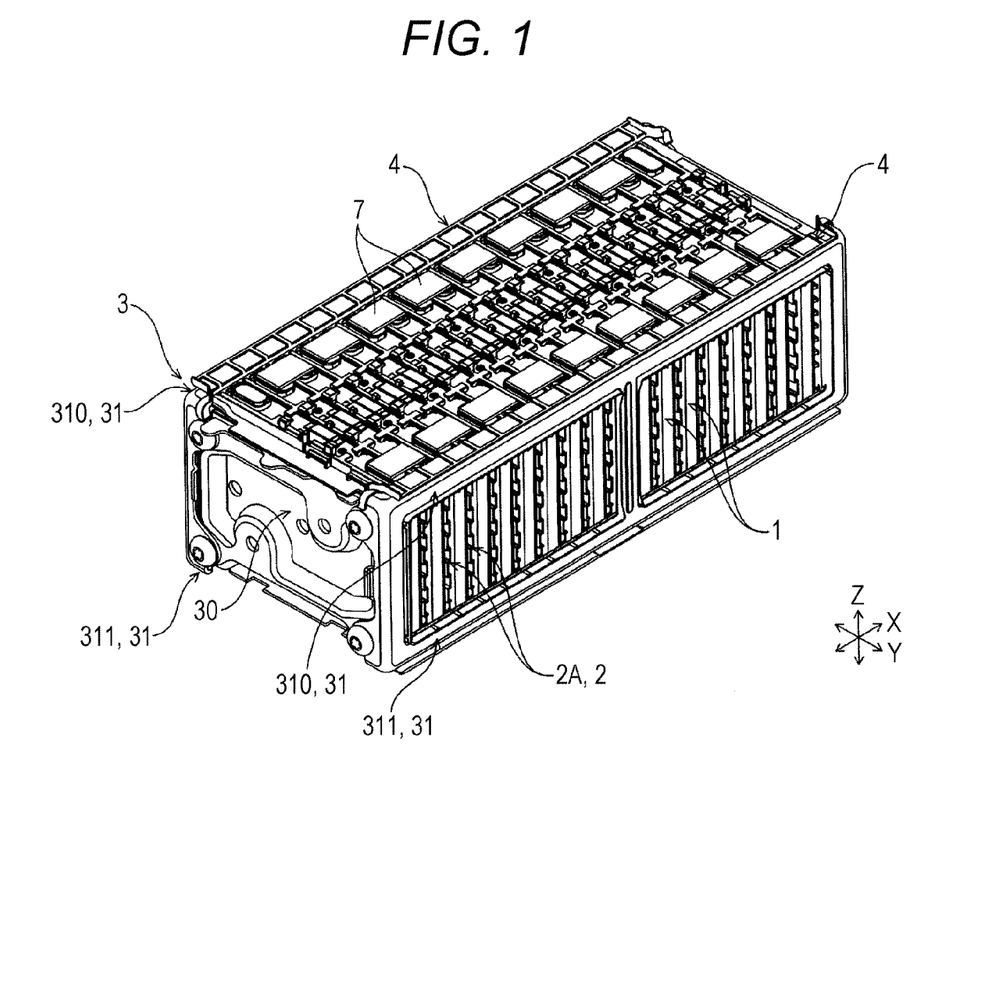
FIG. 1 is a perspective view of an energy storage apparatus according to one embodiment of the present invention.

As shown in FIG. 1, the energy storage apparatus includes: energy storage devices 1; spacers 2 which are arranged adjacent to the energy storage devices 1; and a holder 3 which collectively holds the energy storage devices 1 and the spacers 2. The holder 3 is formed by molding using an electrically conductive material. The energy storage apparatus also includes insulators 4 which are arranged between the energy storage devices 1 and the holder 3.

Figure 2:
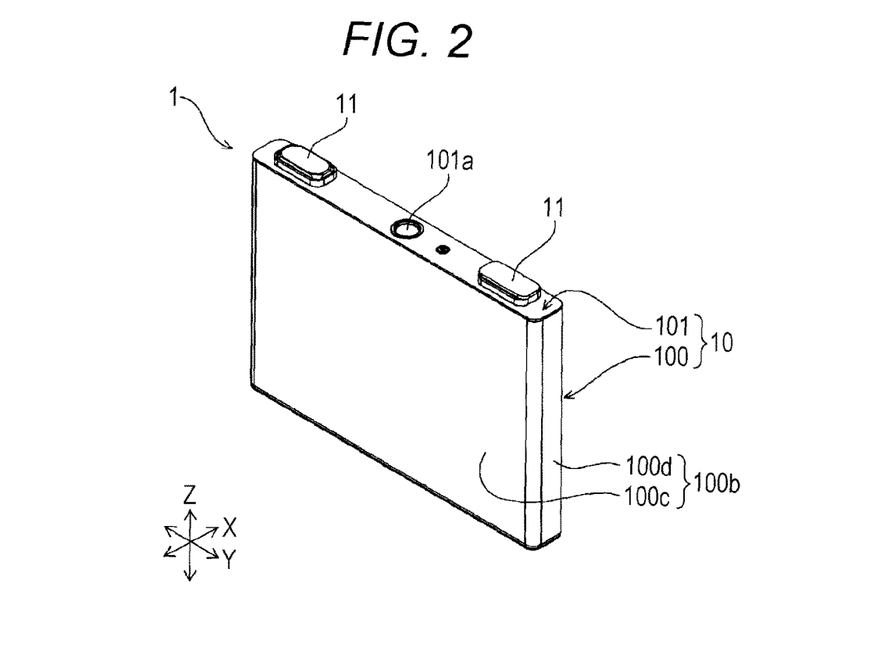
FIG. 2 is a perspective view of an energy storage device in the energy storage apparatus.
Figure 3:
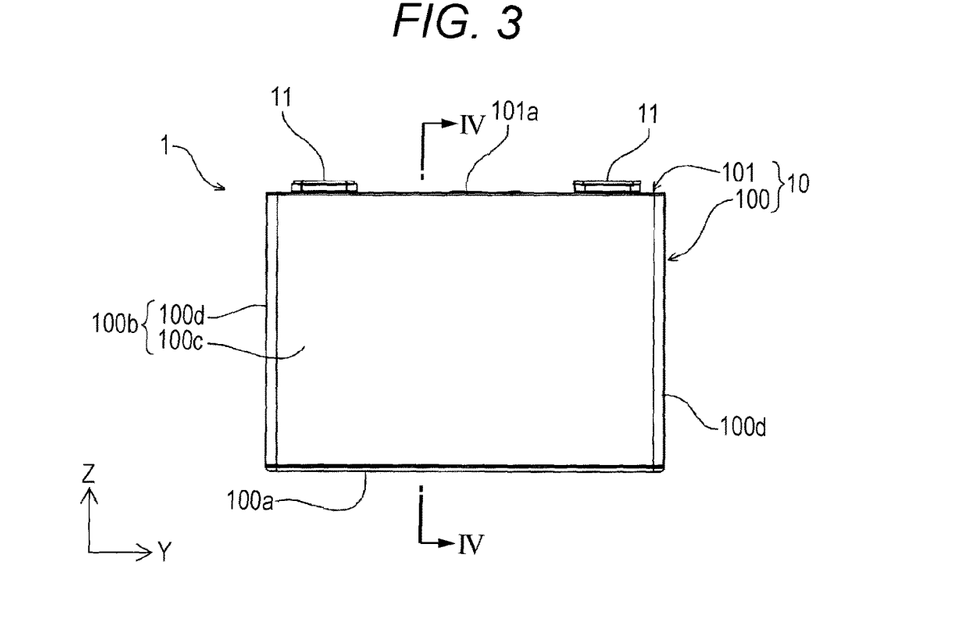
FIG. 3 is a front view of the energy storage device.
Figure 4:
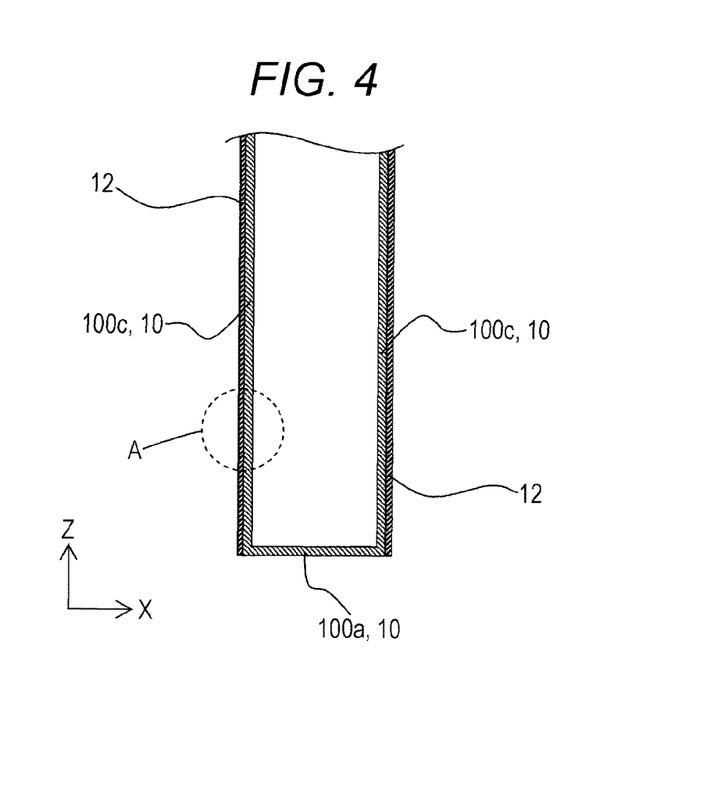
FIG. 4 is a cross-sectional view taken along a line IV-IV in FIG. 3.

As shown in FIG. 2 to FIG. 4, the energy storage device 1 includes: an electrode assembly which includes a positive electrode and a negative electrode; a case 10 which houses the electrode assembly; an insulating film 12 which covers an outer surface of the case 10 and is adhered to at least a portion of the outer surface of the case 10; and a pair of external terminals 11 arranged on the outer surface of the case 10.

The case 10 includes: a case body 100 having an opening; and a lid plate 101 which closes the opening of the case body 100 and has an outer surface on which the pair of external terminals 11 is arranged.

The case body 100 includes: a closing portion 100a (see FIG. 3); and a cylindrical barrel portion 100b which is connected to a periphery of the closing portion 100a so as to surround the closing portion 100a.

The barrel portion 100b includes: a pair of first walls 100c which faces each other with a distance therebetween; and a pair of second walls 100d which faces each other with the pair of first walls 100c interposed therebetween.

The first wall 100c and the second wall 100d are each formed into a rectangular shape. That is, each of the surfaces of the first wall 100c and the second wall 100d is formed of a flat surface, and defines a rectangular region. The first wall 100c and the second wall 100d are arranged adjacent to each other in a state where respective edges of the first and second walls 100c, 100d abut each other. With respect to the first wall 100c and the second wall 100d arranged adjacent to each other, the edge of the first wall 100c and the edge of the second wall 100d are connected to each other over the entire length. Accordingly, the barrel portion 100b is formed into a prismatic cylindrical shape. One end of the barrel portion 100b is closed by the closing portion 100a. The other end of the barrel portion 100b is opened, and is closed by the lid plate 101.

In the embodiment, a surface area of the first wall 100c is set larger than a surface area of the second wall 100d. The barrel portion 100b is formed into a flat prismatic cylindrical shape.

The outer surface of the first wall 100c of the barrel portion 100b of the case 10 oppositely faces the spacer 2. That is, the outer surface of the first wall 100c forms an oppositely-facing region which oppositely faces the spacer 2.

The insulating film 12 covers at least the oppositely-facing region which oppositely faces the spacer 2 in the region of the outer surface of the case 10.

In the energy storage apparatus according to this embodiment, the insulating film 12 covers the whole barrel portion 100b of the case 10 so that the insulating film 12 covers at least the oppositely-facing region. The insulating film 12 is made of a resin material such as polypropylene.

The insulating film 12 is adhered to at least a portion of the outer surface of the case 10. The insulating film 12 is adhered to the outer surface of the case 10 in a region which includes the above-mentioned oppositely-facing region. More specifically, the insulating film 12 is adhered to the outer surface of the barrel portion 100b of the case 10 over the whole region.

In the energy storage apparatus of this embodiment, the whole insulating film 12 is adhered to the barrel portion 100b of the case 10 and hence, the insulating film 12 is adhered over the whole adhesion zone.

Figure 5:
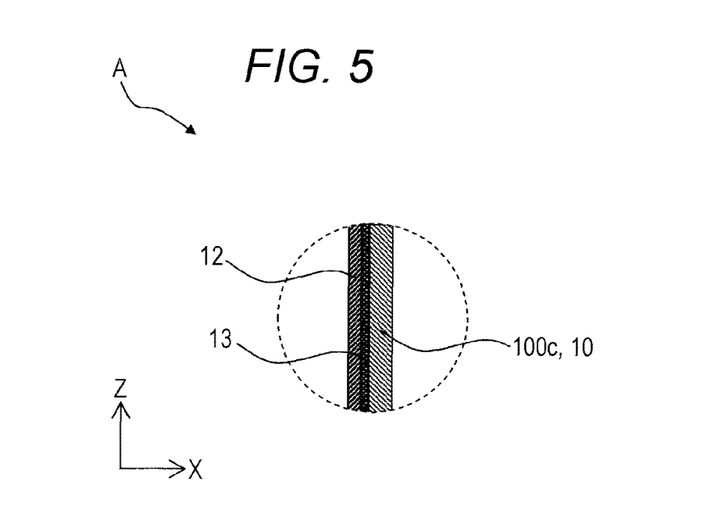
FIG. 5 is a cross-sectional view showing a portion A in FIG. 4 in an enlarged manner.

The insulating film 12 is adhered to the outer surface of the barrel portion 100b of the case 10 by an adhesive agent. As shown in FIG. 5, the energy storage device 1 includes an adhesive layer 13 which is formed between the insulating film 12 and the outer surface of the case 10, with an adhesive agent. The adhesive layer 13 is formed of a cured adhesive agent or an adhesive agent having adhesiveness.

The energy storage apparatus according to this embodiment includes the plurality of energy storage devices 1. The plurality of energy storage devices 1 are arranged in a row in one direction. In this embodiment, the plurality of respective energy storage devices 1 are arranged in a row in a state where the first walls 100c of the cases 10 are directed in one direction. The energy storage apparatus includes bus bars 7 each of which electrically connects the external terminals 11 of two energy storage devices 1 arranged adjacent to each other.

In the description made hereinafter, for the sake of convenience, the direction (first direction) along which the energy storage devices 1 are arranged in a row is referred to as the X axis direction. Further, out of two axial directions which are orthogonal to the direction (X axis direction) along which the energy storage devices 1 are arranged in a row, one direction (second direction) is referred to as the Y axis direction, and the remaining one direction (third direction) is referred to as the Z axis direction. In the respective drawings, three orthogonal axes (coordinate axes) which respectively correspond to the X axis direction, the Y axis direction and the Z axis direction are described complementarily.

The spacer 2 has insulation property. The spacer 2 includes: a base arranged adjacent to the cases 10 of the energy storage devices 1 (the first walls 100c of the barrel portions 100b); and restricting portions which prevent the positional displacement of the energy storage devices 1 arranged adjacent to the base.

Figure 7:
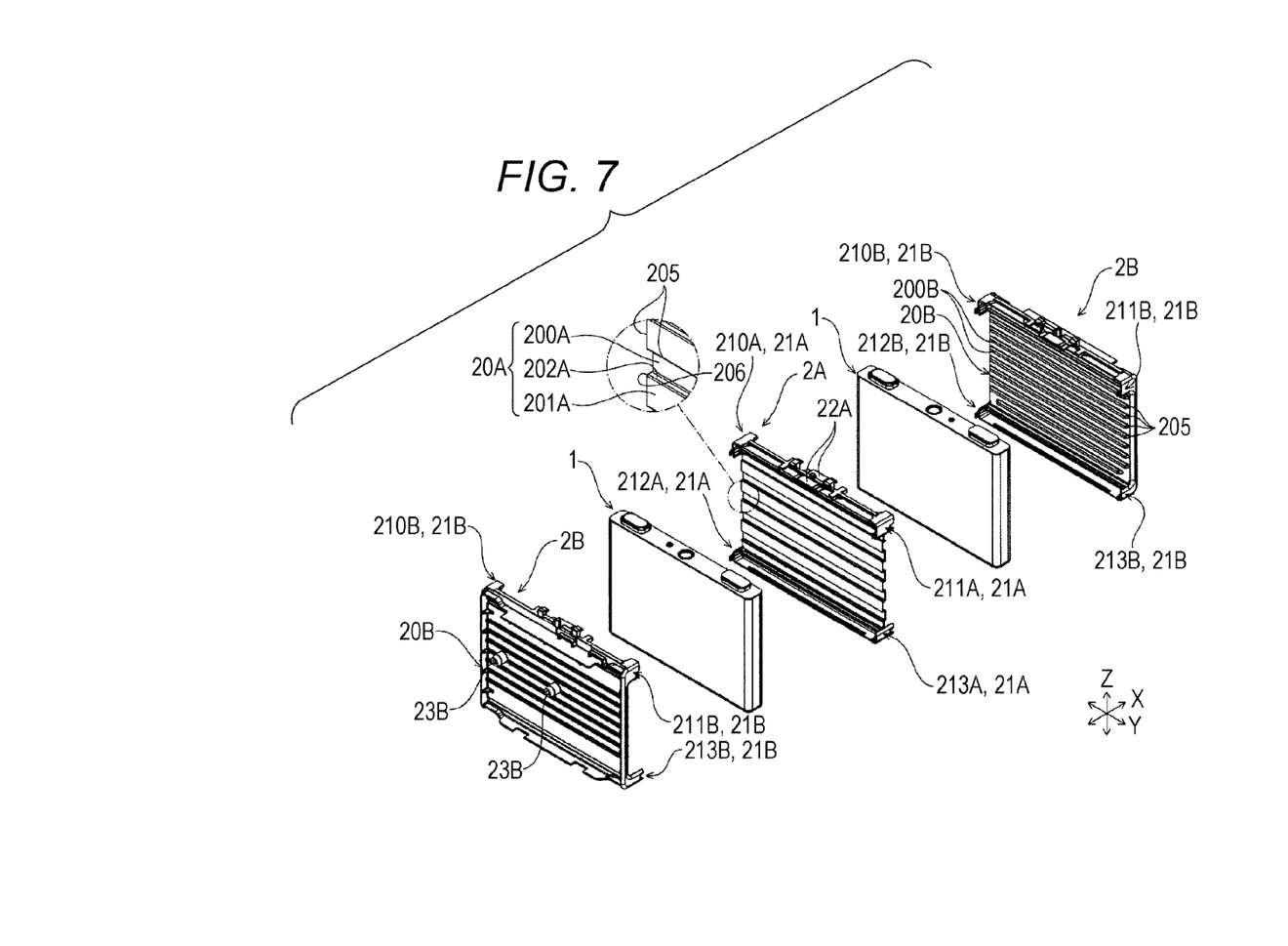
FIG. 7 is a partial exploded perspective view of the energy storage apparatus.

The spacer 2 is described more specifically. As described above, the energy storage apparatus includes the plurality of energy storage devices 1. As shown in FIG. 7, the energy storage apparatus includes two kinds of spacers 2 (2A, 2B). That is, the energy storage apparatus includes, as the spacers 2, spacers 2A each of which is arranged between two energy storage devices 1 arranged adjacent to each other (hereinafter referred to as "inner spacers"); and spacers 2B which are arranged adjacent to the energy storage devices 1 arranged at both outermost ends out of the plurality of energy storage devices 1 (hereinafter referred to as "outer spacers"). The plurality of energy storage devices 1 face at least the inner spacers 2A respectively.

Firstly, the inner spacer 2A is described. As shown in FIG. 7, the inner spacer 2A includes a base 20A arranged adjacent to the energy storage device 1 (the first wall 100c of the case body 100); and restricting portions 21A which prevents the positional displacement of two energy storage devices 1 arranged adjacent to the base 20A. The inner spacer 2A also includes valve cover portions 22A which project from the base 20A and are arranged on lid plates 101 (gas discharge valves 101a) of the energy storage devices 1.

The base 20A of the inner spacer 2A is sandwiched between two energy storage devices 1. Accordingly, the base 20A of the inner spacer 2A has: a first surface which opposedly faces one energy storage device 1 out of two energy storage devices 1 arranged adjacent to each other; and a second surface which is arranged on a side opposite to the first surface and opposedly faces the other energy storage device 1 out of two energy storage devices 1.

The base 20A of the inner spacer 2A has: a first end arranged at a position corresponding to the lid plate 101 of the energy storage device 1: and a second end disposed on a side opposite to the first end and arranged at a position corresponding to the closing portion 100a of the energy storage device 1. The base 20A of the inner spacer 2A also has: a third end arranged at a position corresponding to one second wall 100d of the energy storage device 1; and a fourth end disposed on a side opposite to the third end and arranged at a position corresponding to the other second wall 100d of the energy storage device 1.

The base 20A of the inner spacer 2A has: a first corner portion where the first end and the third end of the base 20A intersect with each other; and a second corner portion where the first end and the fourth end of the base 20A intersect with each other. The base 20A of the inner spacer 2A also has: a third corner portion where the second end and the third end of the base 20A intersect with each other; and a fourth corner portion where the second end and the fourth end of the base 20A intersect with each other.

The first end and the second end of the base 20A of the inner spacer 2A extend in the Y axis direction. The third end and the fourth end of the base 20A of the inner spacer 2A extend in the Z axis direction. Accordingly, the base 20A of the inner spacer 2A is formed into an approximately rectangular shape as viewed from one side in the X axis direction. The base 20A of the inner spacer 2A is formed with a size smaller than a size of the first wall 100c of the energy storage device 1. The base 20A of the inner spacer 2A is arranged so as to be disposed within an outer edge of the first wall 100c of the case 10 as viewed from one side in the X axis direction.

In the energy storage apparatus according to this embodiment, a passage which allows a fluid (a fluid for cooling) to pass therethrough is formed in at least one of a space formed between the first surface of the base 20A of the inner spacer 2A and the energy storage device 1 and a space formed between the second surface of the base 20A of the inner spacer 2A and the energy storage device 1.

In the energy storage device 1 according to this embodiment, the base 20A of the inner spacer 2A is formed into a rectangular corrugated shape. The base 20A of the inner spacer 2A is described more specifically hereinafter. The base 20A of the inner spacer 2A includes: first contact portions 200A which are in contact with the insulating film 12 formed on the case 10 of one energy storage device 1 out of two energy storage devices 1 arranged adjacent to the inner spacer 2A; and second contact portions 201A which are in contact with the insulating film 12 formed on the case 10 of the other energy storage device 1 out of two energy storage devices 1 arranged adjacent to the inner spacer 2A. That is, one of the contact portions 200A and the contact portions 201A of the inner spacer 2A are arranged adjacent to the case 10 (barrel portion 100b) of one of two energy storage devices 1 arranged adjacent to the inner spacer 2A with the insulating film 12 interposed therebetween, and the other of the contact portions 200A and the contact portions 201A of the inner spacer 2A are arranged adjacent to the case 10 of the other of two energy storage devices 1 arranged adjacent to the inner spacer 2A with the insulating film 12 interposed therebetween. The base 20A of the inner spacer 2A further includes joint portions 202A each of which is connected to the first contact portion 200A and the second contact portion 201A.

The first contact portion 200A has a long side thereof in the Y axis direction. The second contact portion 201A has a long side thereof in the Y axis direction.

The base 20A of the inner spacer 2A includes: the plurality of first contact portions 200A; and the plurality of second contact portions 201A. The first contact portions 200A and the second contact portions 201A are alternately arranged in the direction along which the first end and the second end of the base 20A of the inner spacer 2A are arranged.

With such a configuration, in the energy storage apparatus, each passage is defined by a surface of the first contact portion 200A on a side opposite to a surface of the first contact portion 200A which is in contact with the insulating film 12 and the pair of joint portions 202A connected to the first contact portion 200A. In the energy storage apparatus, each passage is defined by a surface of the second contact portion 201A on a side opposite to a surface of the second contact portion 201A which is in contact with the insulating film 12 and the pair of joint portions 202A connected to the second contact portion 201A. Accordingly, in the energy storage apparatus, the passages are respectively defined between the first surface of the base 20A of the inner spacer 2A and the energy storage device 1 as well as between the second surface of the base 20A of the inner spacer 2A and the energy storage device 1.

The opposedly-facing region formed on the barrel portion 100b of the case 10 of the energy storage device 1 opposedly faces at least the inner spacer 2A of the spacer 2. The base 20A of the inner spacer 2A has at least one of edges 205 and corners 206. The adhesion zone defined in the opposedly-facing region includes a position which is disposed on the outer surface of the first wall 100c of the barrel portion 100b, and overlaps with at least one of the edges 205 and the corners 206 of the base 20A of the inner spacer 2A in the direction along which the energy storage devices 1 and the spacers 2 are arranged.

More specifically, either one of surfaces of the first contact portion 200A of the inner spacer 2A opposedly faces and is arranged adjacent to the outer surface of the barrel portion 100b of the case 10 with the insulating film 12 interposed therebetween. A portion of the first contact portion 200A which defines an outer profile of the surface of the first contact portion 200A which opposedly faces and is arranged adjacent to the outer surface of the barrel portion 100b of the case 10 is included in the edge 205 of the spacer 2. Either one of surfaces of the second contact portion 201A of the inner spacer 2A opposedly faces and is arranged adjacent to the outer surface of the barrel portion 100b of the case 10 with the insulating film 12 interposed therebetween. A portion of the second contact portion 201A which defines an outer profile of the surface of the second contact portion 201A which opposedly faces and is arranged adjacent to the outer surface of the barrel portion 100b of the case 10 is included in the edge 205 of the spacer 2. That is, the third end and the fourth end of the inner spacer 2A have edges, and the edges are included in the edges 205 of the spacer 2. The base 20A of the inner spacer 2A includes the plurality of first contact portions 200A and the plurality of second contact portions 201A so that the base 20A of the inner spacer 2A includes the plurality of edges 205.

In a portion of the inner spacer 2A where the first contact portion 200A and the joint portion 202A are connected to each other and the portion extends in the long side direction, parts of the portion positioned at both ends in the long side direction are included in the corners 206 of the spacer 2. Also in a portion of the inner spacer 2A where the second contact portion 201A and the joint portion 202A are connected to each other and the portion extends in the long side direction, parts of the portion positioned at both ends in the long side direction are included in the corners 206 of the spacer 2. The base 20A of the inner spacer 2A has the plurality of joint portions 202A so that the base 20A has the plurality of corners 206.

As described above, the inner spacer 2A is arranged between two energy storage devices 1 arranged adjacent to each other. Accordingly, to restrict the relative movement between two energy storage devices 1 arranged adjacent to the inner spacer 2A, the restricting portions 21A extend toward the energy storage device 1 arranged adjacent to the first surface of the base 20A of the inner spacer 2A and toward the energy storage device 1 arranged adjacent to the second surface of the base 20A of the inner spacer 2A.

This restricting portions 21A are explained more specifically. The restricting portion 21A is formed on respective corner portions of the base 20A of the inner spacer 2A. The inner spacer 2A includes, as the restricting portions 21A: a first restricting portion 210A formed on the first corner portion; a second restricting portion 211A formed on the second corner portion; a third restricting portion 212A formed on the third corner portion; and a fourth restricting portion 213A formed on the fourth corner portion.

The valve cover portions 22A are formed on the first end of the base 20A of the inner spacer 2A. The valve cover portions 22A are described more specifically. The valve cover portions 22A are connected to a center portion of the first end of the base 20A of the inner spacer 2A, and extend toward the energy storage device 1 which is arranged adjacent to the first surface of the base 20A of the inner spacer 2A, and toward another energy storage device 1 which is arranged adjacent to the second surface of the base 20A of the inner spacer 2A. Accordingly, in the energy storage apparatus, the valve cover portions 22A of the respective inner spacers 2A which are arranged adjacent to each other with the energy storage device 1 interposed therebetween cover a gas discharge valve 101a of the energy storage device 1 from above in cooperation.

As described above, the energy storage apparatus according to this embodiment includes the plurality of energy storage devices 1 and hence, the inner spacer 2A is arranged between the energy storage devices 1 arranged adjacent to each other respectively. That is, the energy storage apparatus includes the plurality of inner spacers 2A.

Next, the outer spacer 2B is described. The outer spacer 2B includes: a base 20B having a first surface which opposedly faces the energy storage device 1 (the first wall 100c of the case body 100) and a second surface which is disposed on a side opposite to the first surface (hereinafter referred to as "base 20B"); and restricting portions 21B which determine the position of the energy storage device 1 arranged adjacent to the base 20B (hereinafter referred to as "restricting portions 21B").

The base 20B of the outer spacer 2B in this embodiment opposedly faces an end plate 30 of the holder 3 described later. That is, the outer spacer 2B is arranged between the energy storage device 1 and the end plate 30.

The outer spacer 2B includes shaft portions 23B which are provided for determining the position of the end plate 30 with respect to the base 20B and project from the second surface of the base 20B.

In this embodiment, the outer spacer 2B includes projecting portions 200B which project toward the energy storage device 1 from the first surface of the base 20B and are arranged adjacent to the outer surface of the barrel portion 100b of the case 10 of the energy storage device 1 with the insulating film 12 interposed therebetween. Hereinafter, the projecting portions 200B are referred to as inner contact portions 200B.

The base 20B of the outer spacer 2B extends in the Y axis direction and the Z axis direction orthogonal to the X axis direction. That is, the base 20B is formed into a plate shape. The base 20B of the outer spacer 2B has: a first end arranged at a position corresponding to the lid plate 101 of the energy storage device 1; and a second end disposed on a side opposite to the first end and arranged at a position corresponding to the closing portion 100a of the energy storage device 1. The base 20B of the outer spacer 2B also has a third end arranged at a position corresponding to one second wall 100d of the energy storage device 1; and a fourth end disposed on a side opposite to the third end and arranged at the position corresponding to the other second wall 100d of the energy storage device 1.

The base 20B of the outer spacer 2B has: a first corner portion where the first end and the third end intersect with each other; and a second corner portion where the first end and the fourth end intersect with each other. The base 20B of the outer spacer 2B also has: a third corner portion where the second end and the third end intersect with each other; and a fourth corner portion where the second end and the fourth end intersect with each other.

The first end and the second end of the base 20B of the outer spacer 2B extend in the Y axis direction. The third end and the fourth end of the base 20B of the outer spacer 2B extend in the direction orthogonal to the Z axis direction. Accordingly, the base 20B of the outer spacer 2B has an approximately rectangular shape as viewed from one side in the X axis direction. The base 20B of the outer spacer 2B is formed with a size smaller than a size of the first wall 100c of the energy storage device 1. The base 20B of the outer spacer 2B is arranged so as to be disposed within an outer edge of the first wall 100c of the case 10 as viewed from one side in the X axis direction.

Passages which allow a fluid to pass through between the first surface of the base 20B and the energy storage device 1 are formed on the first surface of the base 20B of the outer spacer 2B.

The base 20B of the outer spacer 2B is described more specifically. The base 20B of the outer spacer 2B has inner contact portions 200B which extend toward the case 10 (the first wall 100c of the case body 100) of the energy storage device 1 from the first surface of the base 20B.

The inner contact portions 200B have a long side thereof in the Y axis direction. In this embodiment, the base 20B of the outer spacer 2B has the plurality of inner contact portions 200B. The plurality of respective inner contact portions 200B are arranged at intervals in the direction orthogonal to the long side direction of the inner contact portion 200B. With this configuration, the plurality of passages (not indicated by numerals in the drawing) are formed between the base 20B of the outer spacer 2B and the energy storage device 1.

In the same manner as the base 20A of the inner spacer 2A described above, the base 20B of the outer spacer 2B includes at least either one of the edges 205 and the corners 206. More specifically, as shown in FIG. 7, end surfaces are formed on distal ends of the inner contact portions 200B extending from the base 20B of the outer spacer 2B. The end surfaces oppositely face and are arranged adjacent to the outer surface of the case 10 with the insulating film 12 interposed therebetween. A portion of the inner contact portion 200B which defines an outer profile of the end surface is included in the edge 205 of the spacer 2. That is, the third end and the fourth end of the outer spacer 2B have edges, and the edges are included in the edges 205 of the spacer 2. The outer spacer 2B includes the plurality of inner contact portions 200B as the base 20B so that the outer spacer 2B includes the plurality of edges 205.

As described above, the first surface of the outer spacer 2B is arranged adjacent to the energy storage device 1. To restrict the relative movement of the energy storage device 1 arranged adjacent to the first surface of the outer spacer 2B, the restricting portions 21B extend toward the energy storage device 1 arranged adjacent to the first surface of the base 20B of the outer spacer 2B.

The restricting portions 2B are explained more specifically. The outer spacer 2B includes, as the restricting portions 21B: restricting portions 21B formed at the first end of the base 20B; and restricting portions 21B formed at the second end of the base 20B.

The outer spacer 2B includes, as the restricting portions 21B: a first restricting portion 210B formed on the first corner portion; a second restricting portion 211B formed on the second corner portion; a third restricting portion 212B formed on the third corner portion; and a fourth restricting portion 213B formed on the fourth corner portion.

As described above, the first surface of the base 20B of the outer spacer 2B opposedly faces the energy storage device 1. Accordingly, the first restricting portion 210B, the second restricting portion 211B, the third restricting portion 212B and the fourth restricting portion 213B extend toward the energy storage device 1 arranged adjacent to the first surface of the base 20B of the outer spacer 2B.

The shaft portions 23B are inserted into insertion holes 300a formed in the end plate 30 described later.

As described above, the outer spacer 2B in this embodiment is arranged adjacent to the inner spacer with the energy storage device 1 interposed therebetween. That is, the energy storage apparatus includes the pair of outer spacers 2B. The outer spacers 2B are arranged adjacent to the energy storage devices 1 disposed at the outermost ends out of the plurality of energy storage devices 1. That is, the pair of outer spacers 2B is provided so as to sandwich the plurality of energy storage devices 1 arranged in a row therebetween.

As described above, in the pair of respective outer spacers 2B, the first surface opposedly faces the case body 100 of the energy storage device 1. Therefore, the pair of respective outer spacers 2B is arranged such that the first surfaces of the bases 20B of the respective outer spacers 2B face each other. Accordingly, in the energy storage apparatus, the pair of outer spacers 2B is arranged symmetrically in the direction (X axis direction) along which the plurality of energy storage devices 1 are arranged in a row.

Figure 6:
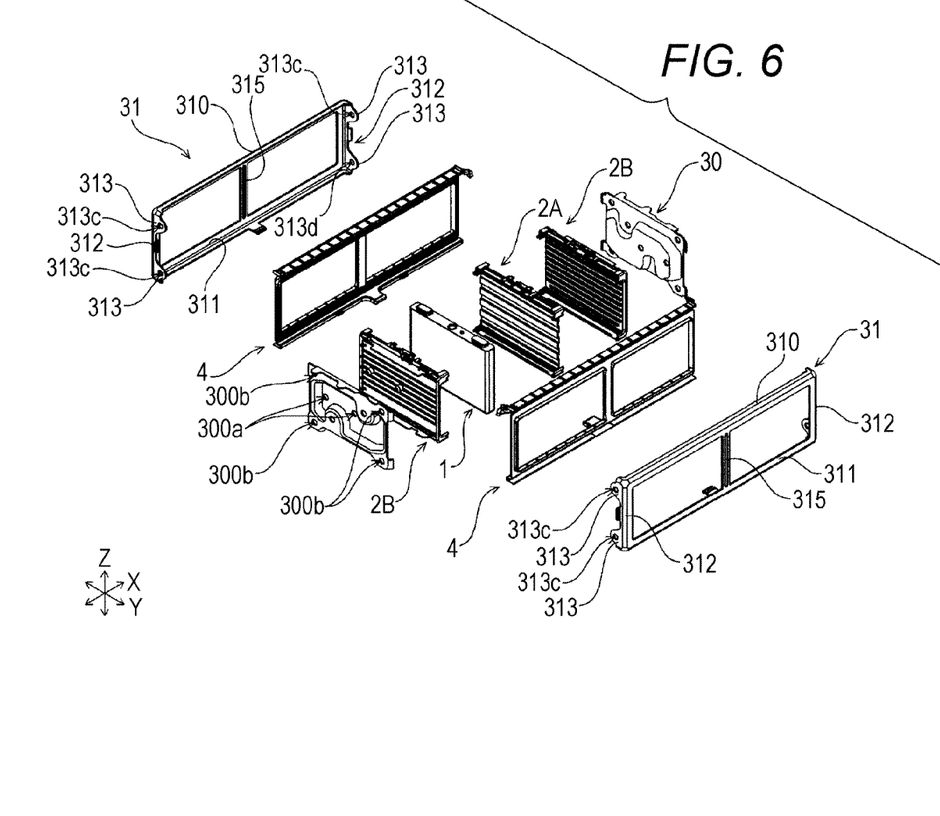
FIG. 6 is an exploded perspective view of the energy storage apparatus.

In this embodiment, the holder 3 is made of metal. As shown in FIG. 6, the holder 3 includes: a pair of end plates 30 which is arranged at positions where the end plates 30 are arranged adjacent to the outer spacers 2B respectively; and frames 31 which connect the pair of end plates 30 to each other.

The end plate 30 has insertion holes 300a formed at positions corresponding to the shaft portions 23B of the outer spacer 2B. The end plate 30 also has a plurality of (four in this embodiment) through holes 300b formed in the corner portions thereof respectively.

The frame 31 has a first connecting portion 310 which extends between the pair of end plates 30 and is arranged at the position corresponding to the lid plates 101 of the energy storage devices 1; and a second connecting portion 311 which extends between the pair of end plates 30 and is arranged at the position corresponding to the closing portions 100a of the energy storage devices 1.

The frame 31 also has a pair of support portions 312 connected with the first connecting portion 310 and the second connecting portion 311. The frame 31 has a reinforcement portion 315 connected with the first connecting portion 310 and the second connecting portion 311.

In this embodiment, the frame 31 is formed into a frame shape by connecting the support portions 312 to the first connecting portion 310 and the second connecting portion 311 respectively.

As described above, the reinforcement portion 315 connects the first connecting portion 310 and the second connecting portion 311 to each other. With such a configuration, in the frame 31, the deformation of the first connecting portion 310 and the second connecting portion 311 is suppressed by the reinforcement portion 315.

The frame 31 has fixing portions 313 which are connected to the end plates 30. The fixing portions 313 are formed on both end portions of the first connecting portion 310 as well as on both end portions of the second connecting portion 311. The respective fixing portions 313 opposedly face the respective through hole 300b formed in the end plate 30 and respective portions surrounding the through hole 300b. Hole portions 313c are formed in the respective fixing portions 313 at positions corresponding to the through holes 300b.

Accordingly, the respective connecting portions 310, 311 are connected to the end plates 30 by threadedly mounting nuts on bolts which pass through the through holes 300b formed in the end plates 30 and the hole portions 313c formed in the fixing portions 313. The corners 206 of the above-mentioned spacer 2 are arranged inside the hole portions 313c (or the through holes 300b formed in the end plate 30) as viewed in the X axis direction.

The insulators 4 are made of a material having insulation property.

As described above, in the energy storage apparatus of this embodiment, portions of the insulating film 12 with which the edges 205 and the like of the spacer 2 (the base 20A of the inner spacer 2A, the base 20B of the outer spacer 2B) are brought into contact and peripheries around the portions are adhered to the outer surface of the first wall 100c of the case body 100 of the case 10.

The energy storage apparatus of this embodiment having the above-mentioned configuration includes: at least one energy storage device 1 which includes the electrode assembly and the case 10 for housing the electrode assembly; the spacer 2 which is arranged adjacent to the case 10 with the insulating film 12 interposed therebetween; and the holder 3 which holds the energy storage device 1 and the spacer 2. The energy storage device 1 includes the insulating film 12 which covers the outer surface of the case 10 and is adhered to at least a portion of the outer surface of the case 10. The spacer 2 has at least either one of the edges 205 and the corners 206 thereof disposed at positions where the edges 205 or the corners 206 are in contact with the outer surface of the case 10 with the insulating film 12 interposed therebetween. The insulating film 12 is adhered to the outer surface of the case 10 in the adhesion zone of the opposedly-facing region where the outer surface of the case 10 opposedly faces the spacer 2, the adhesion zone overlapping with at least one of the edges 205 and the corners 206 of the spacer 2 in the direction along which the energy storage device 1 and the spacer 2 are arranged.

In the energy storage apparatus of this embodiment, the insulating film 12 is adhered to the outer surface of the case 10 in the region (the adhesion zone) including positions where the adhesion zone overlaps with at least either one of the edges 205 and the corners 206 of the spacer 2 (hereinafter also simply referred to as "edges or the like") as viewed in the X axis direction. That is, the portions of the insulating film 12 with which the edges 205 or the like of the spacer 2 are brought into contact and peripheries around such portions are adhered to the outer surface of the case 10. Accordingly, even when a small crack or the like occurs in the portion of the insulating film 12 which corresponds to the adhesion zone due to rubbing or the like between the insulating film 12 and the edges 205 or the like of the spacer 2, the expansion of the crack or the like can be suppressed by the above-mentioned adhesion and hence, the deterioration of insulation property of the case 10 can be suppressed.

In the energy storage apparatus of the above-mentioned embodiment, the energy storage apparatus includes the plurality of energy storage devices 1 arranged in a row, the spacer 2 includes the inner spacer 2A arranged between the energy storage devices 1 arranged adjacent to each other, and the opposedly-facing region of each of the plurality of energy storage devices 1 is a region formed on the outer surface of the case 10 which opposedly faces the inner spacer 2A. Accordingly, even when a small crack or the like occurs in the insulating films 12 which cover the respective cases 10 of the energy storage devices 1 arranged adjacent to each other with the inner spacer 2A interposed therebetween due to rubbing or the like of the insulating film 12 with the edges 205 or the like of the inner spacer 2A, the expansion of the crack or the like can be suppressed and hence, it is possible to prevent short-circuit between the metal cases 10 of the energy storage devices 1 arranged adjacent to each other with the inner spacer 2A interposed therebetween. When short-circuit occurs between the cases 10, performance of the energy storage apparatus is lowered.

In the energy storage apparatus of the above-mentioned embodiment, the case 10 includes a bottomed cylindrical case body 100 having a prismatic cylindrical barrel portion, and the insulating film 12 covers a whole barrel portion. Accordingly, in the case 10 of the so-called prismatic energy storage device 1, the barrel portion having a large surface area is insulated as a whole. With such a configuration, in the energy storage apparatus which includes the plurality of energy storage devices 1, short-circuit between the cases 10 of the energy storage devices 1 arranged adjacent to each other with the inner spacer 2A interposed therebetween can be effectively prevented.

In the energy storage apparatus of the above-mentioned embodiment, the whole insulating film 12 is adhered to the case 10. Accordingly, even when small crack or the like occurs in the insulating film 12 at a portion other than a portion of the insulating film 12 which is rubbed with the edges 205 or the like of the spacer 2, the expansion of the crack or the like can be suppressed.

As described above, in the energy storage apparatus of the above-mentioned embodiment, the corners 206 of the spacers 2 are arranged inside the hole portions 313c (or the through holes 300b formed in the end plate 30) as viewed in the X axis direction. A retention force of the holder 3 for holding the plurality of energy storage devices 1 and the spacers 2 acts on the hole portions 313c formed in the fixing portions 313, for example. Such a retention force may be alleviated by the spacers 2 due to the deflection of the spacers 2. However, although a retention force may be alleviated at portions of the spacer 2 disposed outside the hole portions 313c (or through holes 300b) as viewed in the X axis direction, the retention force is minimally alleviated at portions of the spacer 2 disposed inside the hole portions 313c (or through holes 300b). Accordingly, the edges 205 and the corners 206 of the spacer 2 which are disposed inside the hole portions 313c (or through holes 300b) are arranged at positions where a crack is liable to occur in the insulating film 12. However, in the energy storage apparatus of the above-mentioned embodiment, it is also possible to suppress the occurrence of cracks in the insulating film 12 by the edges 205 and the corners 206 of the spacer 2 disposed inside the hole portions 313c (or through holes 300b). Although the corner 206 has a sharper profile than the edge 205, in the energy storage apparatus of the above-mentioned embodiment, it is also possible to suppress the expansion of crack or the like in the insulating film 12 caused by the corner 206.

It is needless to say that the energy storage apparatus according to the present invention is not limited to the above-mentioned embodiment, and various modifications are conceivable without departing from the gist of the present invention.

In the above-mentioned embodiment, the base 20A of the inner spacer 2A has an approximately rectangular shape as viewed from one side in the X axis direction. However, provided that the base 20A of the inner spacer 2A can make the postures of two energy storage devices 1 arranged adjacent to the inner spacer 2A correspond to each other, the shape of the base 20A is not limited to an approximately rectangular shape.

Figure 8:
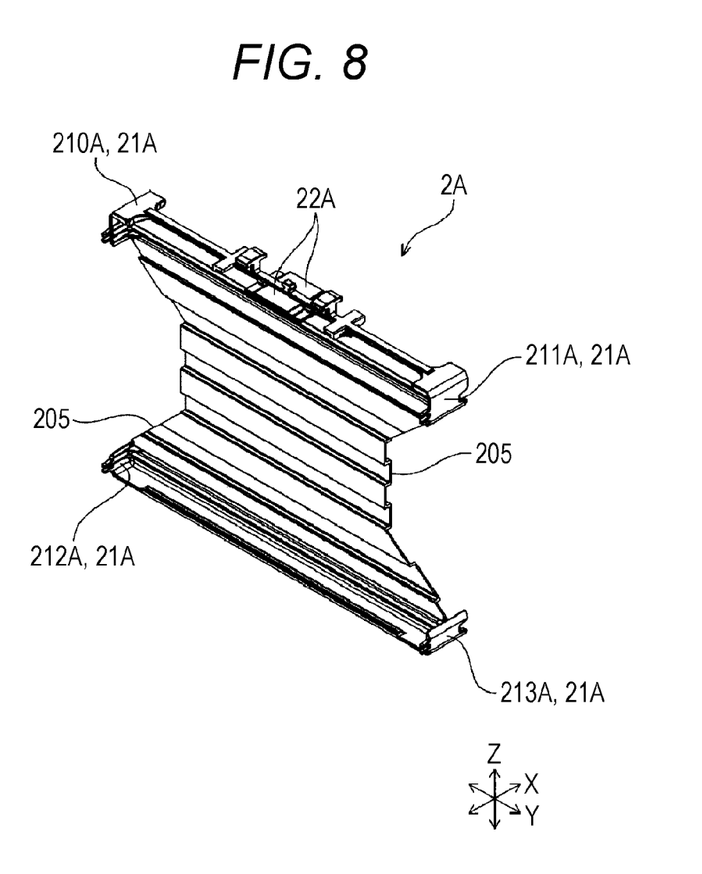
FIG. 8 is a perspective view of an inner spacer of an energy storage apparatus according to another embodiment of the present invention.

For example, the base 20A of the inner spacer 2A may be formed into a shape where a portion of the base 20A having an approximately rectangular shape is cut away. More specifically, as shown in FIG. 8, the base 20A may be formed such that lengths of the first contact portion 200A and the second contact portion 201A in the long side direction at a center portion of the base 20A in the Z axis direction are set shorter than lengths of the respective contact portions 200A, 201A in the long side direction at both end portions of the base 20A in the Z axis direction, and the base 20A may be formed so as to have an approximately symmetrical shape with respect to a line which passes through the center portion and extends in the Z axis direction as viewed from one side in the X axis direction. By forming the base 20A in such an approximately symmetrical shape, compared to the case where the base 20A has an approximately rectangular shape as described above, lengths of the edges of the base 20A at both ends in the Y axis direction (lengths of the edges in the Z axis direction) are increased. The above-mentioned lengths of the edges 205 of the spacer 2 are also increased by an amount corresponding to the increase of lengths of the end edges so that the edges 205 and the insulating film 12 are easily brought into contact with each other. However, the insulating film 12 is adhered to the case 10 as described above and hence, the expansion of crack or the like in the insulating film 12 can be suppressed by the adhesion with the case 10.

In the above-mentioned embodiment, the base 20A of the inner spacer 2A is formed with a size smaller than a size of the first wall 100c of the energy storage device 1 as viewed from one side in the X axis direction. However, a size of the base 20A of the inner spacer 2A is not limited to a size which is smaller than a size of the first wall 100c of the energy storage device 1. For example, the base 20A of the inner spacer 2A may be formed such that the base 20A project from the first wall 100c of the energy storage device 1 as viewed from one side in the X axis direction.

In the above-mentioned embodiment, the insulating film 12 covers the whole barrel portion 100b of the case 10. The insulating film 12 may further cover an outer surface of the closing portion 100a of the case 10. On the other hand, the insulating film 12 may cover a portion of the barrel portion 100b of the case 10.

In the above-mentioned embodiment, the whole insulating film 12 is adhered to the outer surface of the case 10. However, the adhesion of the insulating film 12 is not limited to the mode where the whole insulating film 12 is adhered to the outer surface of the case 10, and a portion of the insulating film 12 may be adhered to the outer surface of the case 10. That is, while covering the opposedly-facing region formed on the outer surface of the case 10 which opposedly faces the spacer 2, the insulating film 12 may be adhered to the outer surface of the case 10 in the adhesion zone and may not be adhered to portions of the opposedly-facing region other than the adhesion zone.

In the above-mentioned embodiment, four hole portions 313c are formed in the fixing portions 313 of the frames 31 (or four through holes 300b are formed in the end plate 30) at one end of the energy storage apparatus in the X axis direction. However, the number of hole portions 313c (or through holes 300b) formed at one end of the energy storage apparatus in the X axis direction may be two or three.

What is claimed is:

1. An energy storage apparatus, comprising:
    a first energy storage device and a second energy storage device which are arranged adjacent to each other in a first direction, and each of which includes an electrode assembly and a case for housing the electrode assembly;
    a spacer which is arranged adjacent to the case and between the first energy storage device and the second energy storage device; and
    a holder which holds the first energy storage device and the second energy storage device and the spacer,
    wherein each of the first energy storage device and the second energy storage device includes:
        an insulating film which covers an outer surface of the case and is adhered to at least a portion of the outer surface of the case; and
        an adhesive layer which adheres the insulating film to the outer surface of the case,
    wherein the spacer includes:
        a plurality of first contact portions including at least one of an edge and a corner which is in contact with the outer surface of the case of the first energy storage device with the insulating film interposed therebetween; and
        a plurality of second contact portions including at least one of an edge and a corner which is in contact with the outer surface of the case of the second energy storage device with the insulating film interposed therebetween,
    wherein the plurality of the first contact portions and the plurality of the second contact portions are arranged alternately when viewed from a second direction orthogonal to the first direction,
    wherein the insulating film of the first energy storage device is adhered to the outer surface of the case of the first energy storage device in a first adhesion zone which overlaps with at least one of the edge and the corner of the first contact portions in the first direction,
    wherein the insulating film of the second energy storage device is adhered to the outer surface of the case of the second energy storage device in a second adhesion zone which overlaps with at least one of the edge and the corner of the second contact portions in the first direction,
    wherein the plurality of the first contact portions and the plurality of the second contact portions form a base of the spacer, the base extending in a third direction orthogonal to the first direction and the second direction, and
    wherein, in the base, the plurality of the first contact portions protrude toward the case of the first energy storage device in the first direction, and the plurality of the second contact portions protrude toward the case of the second energy storage device in a direction opposite to the first direction.

2. The energy storage apparatus according to claim 1, wherein the case of the first energy storage device includes a bottomed cylindrical case body including a prismatic cylindrical barrel portion, and
    wherein the insulating film covers an entirety of the barrel portion.

3. The energy storage apparatus according to claim 1, wherein an entirety of the insulating film is adhered to the case of the first energy storage device.

4. The energy storage apparatus according to claim 1, wherein the base is arranged adjacent to the case of the first energy storage device and the case of the second energy storage device.

5. The energy storage apparatus according to claim 4, wherein at least a portion of the base is cut away to form the edge of the first contact portions.

6. The energy storage apparatus according to claim 4, wherein at least a portion of the base in an end, in a long side direction thereof, is cut away to form the edge of the first contact portions.

7. The energy storage apparatus according to claim 4, wherein at least portions of the base, in both ends in a long side direction thereof, are cut away to form edges.

8. The energy storage apparatus according to claim 7, wherein the base has an approximately symmetrical shape when viewed in a direction along which the first energy storage device and the spacer are arranged.

9. The energy storage apparatus according to claim 1, wherein the adhesive layer is disposed between the insulating film and the outer surface of the case of the first energy storage device.

10. The energy storage apparatus according to claim 1, wherein an entirety of the insulating film is substantially flat.

11. The energy storage apparatus according to claim 1, wherein a bottom surface of the case of the first energy storage device is exposed from the insulating film.

12. The energy storage apparatus according to claim 1, wherein an entirety of the insulating film is a single layer.

13. The energy storage apparatus according to claim 1, wherein, above a bottom surface of the case of the first energy storage device, the insulating film is adhered to an entire area of the outer surface of the case of the first energy storage device.

14. An energy storage apparatus, comprising:
a first energy storage device and a second energy storage device which are arranged adjacent to each other in a first direction, and each of which includes an electrode assembly and a case for housing the electrode assembly;
a spacer which is arranged adjacent to the case and between the first energy storage device and the second energy storage device; and
a holder which holds the first energy storage device and the second energy storage device and the spacer,
wherein each of the first energy storage device and the second energy storage device includes an insulating film which covers an outer surface of the case and is adhered to at least a portion of the outer surface of the case,
wherein the spacer includes:
a plurality of first contact portions including at least one of an edge and a corner which is in contact with the outer surface of the case of the first energy storage device with the insulating film interposed therebetween; and
a plurality of second contact portions including at least one of an edge and a corner which is in contact with the outer surface of the case of the second energy storage device with the insulating film interposed therebetween,
wherein the plurality of the first contact portions and the plurality of the second contact portions are arranged alternately when viewed from a second direction orthogonal to the first direction,
wherein the insulating film of the first energy storage device is adhered to the outer surface of the case of the first energy storage device in a first adhesion zone which overlaps with at least one of the edge and the corner of the first contact portions in the first direction,
wherein the insulating film of the second energy storage device is adhered to the outer surface of the case of the second energy storage device in a second adhesion zone which overlaps with at least one of the edge and the corner of the second contact portions in the first direction,
wherein a bottom surface of the case is exposed from the insulating film,
wherein the plurality of the first contact portions and the plurality of the second contact portions form a base of the spacer, the base extending in a third direction orthogonal to the first direction and the second direction, and
wherein, in the base, the plurality of the first contact portions protrude toward the case of the first energy storage device in the first direction, and the plurality of the second contact portions protrude toward the case of the second energy storage device in a direction opposite to the first direction.

15. The energy storage apparatus according to claim 14, wherein an entirety of the insulating film is a single layer.

16. The energy storage apparatus according to claim 14, wherein, above a bottom surface of the case of the first energy storage device, the insulating film is adhered to an entire area of the outer surface of the case of the first energy storage device.

17. An energy storage apparatus, comprising:
a first energy storage device and a second energy storage device which are arranged adjacent to each other in a first direction, each of which includes an electrode assembly and a case for housing the electrode assembly;
a spacer which is arranged adjacent to the case and between the first energy storage device and the second energy storage device; and
a holder which holds the first energy storage device and the second energy storage device and the spacer,
wherein each of the first energy storage device and the second energy storage device includes an insulating film which covers an outer surface of the case and is adhered to at least a portion of the outer surface of the case,
wherein the spacer includes:
a plurality of first contact portions including at least one of an edge and a corner which is in contact with the outer surface of the case of the first energy storage device with the insulating film interposed therebetween; and
a plurality of second contact portions including at least one of an edge and a corner which is in contact with the outer surface of the case of the second energy storage device with the insulating film interposed therebetween,
wherein the plurality of the first contact portions and the plurality of the second contact portions are arranged alternately when viewed from a second direction orthogonal to the first direction,
wherein the insulating film of the first energy storage device is adhered to the outer surface of the case of the first energy storage device in a first adhesion zone which overlaps with at least one of the edge and the corner of the first contact portions in the first direction,
wherein the insulating film of the second energy storage device is adhered to the outer surface of the case of the second energy storage device in a second adhesion zone which overlaps with at least one of the edge and the corner of the second contact portions in the first direction, wherein an entirety of the insulating film is substantially flat, wherein the plurality of the first contact portions and the plurality of the second contact portions form a base of the spacer, the base extending in a third direction orthogonal to the first direction and the second direction, and wherein, in the base, the plurality of the first contact portions protrude toward the case of the first energy storage device in the first direction, and the plurality of the second contact portions protrude toward the case of the second energy storage device in a direction opposite to the first direction.

18. The energy storage apparatus according to claim 17, wherein a bottom surface of the case of the first energy storage device is exposed from the insulating film.

19. The energy storage apparatus according to claim 1, wherein, in the third direction, each of the plurality of the first contact portions is located between adjacent contact portions of the plurality of the second contact portions.

* * * * *